United States Patent

[11] 3,594,665

[72] Inventors Eric Metcalf;
 Edward A. Martin, both of Farnborough, England
[21] Appl. No. 775,725
[22] Filed Nov. 14, 1968
[45] Patented July 20, 1971
[73] Assignee The Solartron Electronic Group Limited
 Farnborough, England
[32] Priority Nov. 22, 1967
[33] Great Britain
[31] 53239/67

[54] DELAY LINES WITH ADDED SHUNT CONDUCTANCE
 9 Claims, 6 Drawing Figs.

[52] U.S. Cl. .................................................. 333/31,
 333/84, 315/3.5
[51] Int. Cl. ........................................................ H03h 9/30
[50] Field of Search............................................ 333/31, 84
 M, 84; 315/3.5, 3.5 X, 3.6, 3.6 X

[56] References Cited
 UNITED STATES PATENTS
1,815,629  7/1931  Milnor et al. .................. 333/23 X
2,250,461  7/1941  Batchelder .................... 333/29
2,945,195  7/1960  Matthaei ....................... 333/84 M X
3,327,248  6/1967  Johnson ........................ 333/31

FOREIGN PATENTS
1,000,543  1/1957  Germany....................... 333/84 M

OTHER REFERENCES
COMMUNICATION NETWORKS, Vol. II, " The Classical Theory Of Long Lines, Filters And Related Networks," by Guillemin, July 1936, pages 88— 90, relied upon.

Primary Examiner—Herman Karl Saalbach
Assistant Examiner—Saxfield Chatmon, Jr.
Attorneys—William R. Sherman, Stewart F. Moore, Jerry M. Presson and Roylance, Abrams, Kruger, Berdo & Kaul ABSTRACT: A delay line in which resistors or resistive films are connected between conducting strips so to shunt-load the line that L/R is substantially equal to C/G, where for a predetermined unit length of line L is the series inductance, R is the series resistance, C is the shunt capacitance and G is the shunt conductance.

INVENTORS
Eric Metcalf
Edward A. Martin

BY *JM Presson*
ATTORNEY

DELAY LINES WITH ADDED SHUNT CONDUCTANCE

The present invention relates to delay lines as used in many branches of electrical engineering such as digital computers and cathode-ray oscilloscopes.

In oscilloscopes designed to display high frequency electrical signals, that is signals with a frequency greater than 5 MHz., it is necessary to delay the signal applied to the Y-plates of the oscilloscope if the part of the signal which triggers the time base is to be seen on the display.

Such delay lines usually comprise a network of series-connected inductors with shunt-connected capacitors or a coaxial line wherein the inner conductor is a continuous coil of wire wound on an insulating core.

An oscilloscope is used not only to display the waveforms of electrical signals applied to its Y-plates, but also the measure the amplitude of such signals. It is essential, therefore, to ensure that input signals having a frequency within the range of frequencies for which the oscilloscope is designed are attenuated equally by the delay line. For such a condition to obtain a delay line should then have a substantially constant impedance over the frequency range concerned. The necessary condition for such constant impedance is that the ratio of the series inductance of the delay line to the series resistance is equal to the ratio of the shunt capacitance to the shunt conductance per unit length of line.

For practical delays both the network of inductors and capacitors and the coaxial line are too large to be incorporated conveniently in modern equipment. They are also expensive.

The size of delay lines has been reduced by the use of printed wiring on both sides of a flexible insulating substrate. The degree of reduction has hitherto been limited by the increase in series resistance caused by the necessary reduction in the width of the wire. The skin effect limits the effectiveness of increasing the thickness of the wiring to overcome this in delay lines intended for use at high frequencies.

Similarly reductions in the dimensions of delay lines made up of continuous coils of wire causes increase in series resistance.

The increase in the series resistance causes the ratio of inductance to series resistance to be less than the ratio of the shunt capacitance to shunt conductance and introduces frequency distortions which are not readily compensated by the use of terminating lumped components.

According to the present invention there is provided an electrical delay line having two conducting paths between two input terminals and two output terminals respectively, at least one of the paths having inductive loops along its length and there being capacitance between the two paths along their lengths, and for a predetermined unit length of the line the series inductance thereof being L, the series resistance thereof being R, the shunt capacitance thereof being C and the line being artificially resistively shunt-loaded along its length such that the ratio L/R is substantially equal to C/G where G is the shunt conductance of the unit length of line. Thus by introducing the artificial and distributed resistive loading the series resistance R can be substantially increased by reducing the diameters of the wire used whereby compact constructions are substantially facilitated. In a specific example the invention enables the volume of the line to be reduced from about 11 cubic inches to less than 1 cubic inch. The artificial resistive loading can be in the form of discrete shunt resistors distributed along the line.

Embodiments of the invention will now be described by way of example, with reference to the accompanying drawings of which:

Figure 1:
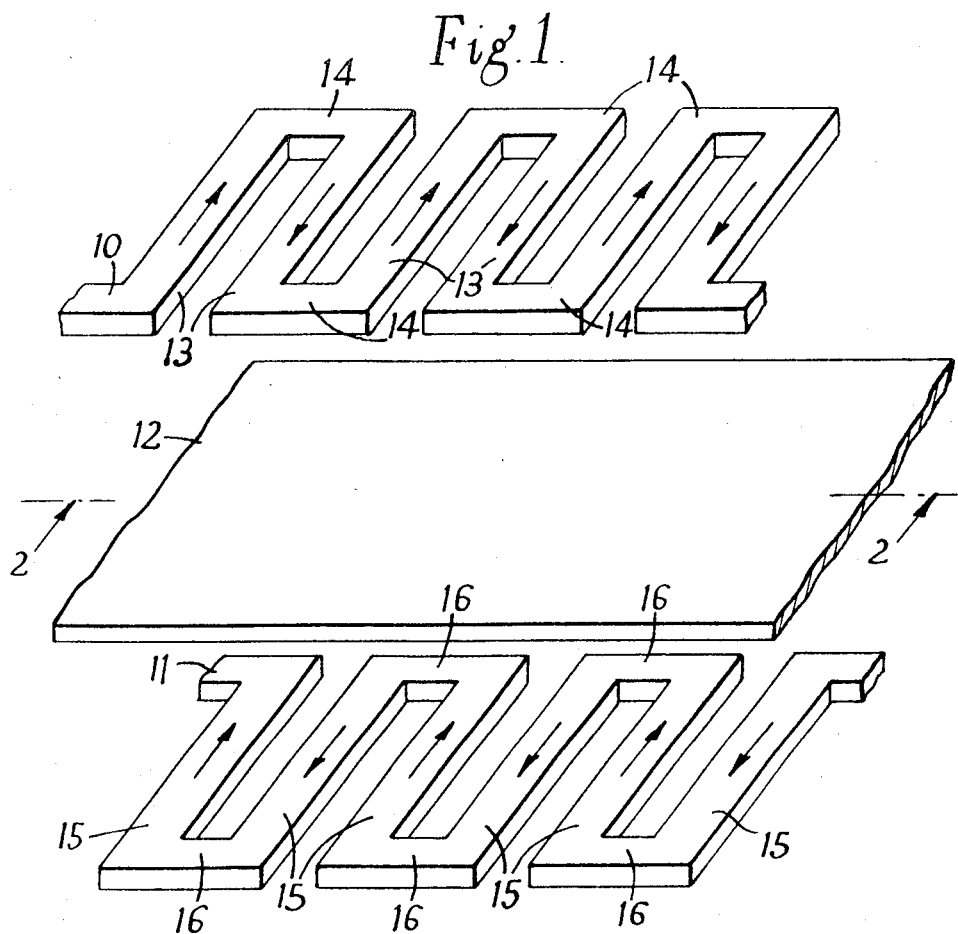
FIG. 1 shows an exploded view of part of a known delay line.

Referring to FIG. 1, this shows an exploded view of a known delay line. Two continuous electrically conducting strips 10 and 11 are mounted on a flexible electrically insulating substrate 12, one strip on each side of the substrate 12, The strip 10 has transverse parts 13 and longitudinal parts 14. The strip 11 has transverse parts 15 and longitudinal parts 16. Thus the strips 10 and 11 have inductive loops along their lengths.

Figure 2:
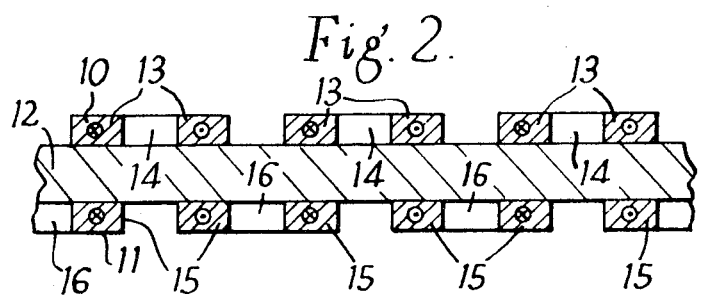
FIG. 2 shows a section 2-2 of the delay line shown in FIG. 1.

Each transverse part 13 of the strip 10 is mounted on a region of the substrate 12 which has mounted on its other side one of the transverse parts 15 of the strip 11, as shown in FIG. 2.

Each longitudinal part 14 of the strip 10 joining a pair of transverse parts 13 of the strip 10 is at the opposite edge of the substrate 12 to the longitudinal part 16 of the strip 11 joining the corresponding pair of transverse parts 15 of strip 11.

The longitudinal parts 14 of strip 10 joining one transverse part 13 to its two adjacent transverse parts 13 are on opposite edges of the substrate 12.

The longitudinal parts 16 of the strip 11 joining one transverse part 15 to its two adjacent transverse parts 15 are on opposite edges of the substrate 12.

When a current flows through the strips it flows in the same direction in corresponding transverse parts 13 and 15 on opposite sides of the substrate 12 and in opposite directions in the longitudinal parts 14 and 16 on opposite sides of the substrate 12. The electric fields due to the voltage cancel and the magnetic fields due to the currents add. There is inductance along each strip and shunt capacitance between the strips. The inductance of a given unit length of line increases as the spacing between the transverse parts is decreased and the characteristic impedance is determined by the dimensions of the strips the distance between them and the nature and thickness of the substrate.

Since the substrate is flexible the delay line can be rolled up before being installed for use, Even in a rolled-up state a delay line giving a useful delay time is bulkier than is desirable.

Reducing the dimensions of the delay line requires a reduction of the width of the strips which increases their series resistance. From a practical viewpoint the increase in resistance cannot be compensated significantly by increasing the thickness of the strip in delay lines intended for use at high frequencies because of the "skin effect," neither can the distortions caused by the ratio of the inductance to the series resistance not being equal to the ratio of the shunt capacitance to the shunt conductance be readily compensated by the addition of lumped components at the terminations.

Figure 3:
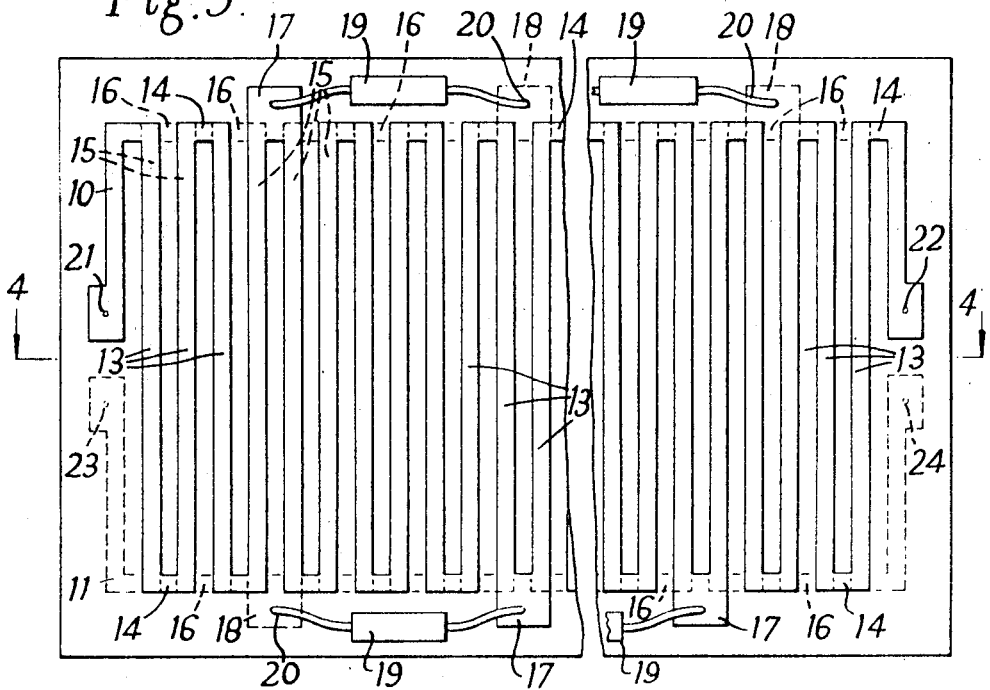
FIG. 3 shows a fragmentary plan of one embodiment of the invention.

Referring to FIG. 3, this shows a fragmentary plan view of one embodiment of the invention.

Two electrically conducting strips 10 and 11 are mounted on either side of an insulating substrate 12. The strip 10 has transverse parts 13 and longitudinal parts 14 together forming inductive loops. Similarly the strip 11 has transverse parts 15 and longitudinal parts 16 as shown in FIG. 4.

Figure 4:
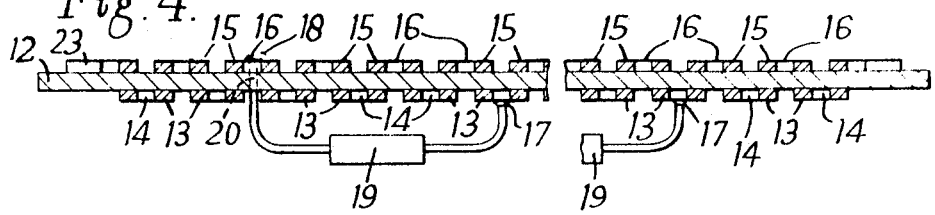
FIG. 4 shows a section 4-4 of the embodiment of the invention shown in FIG. 3.

Each transverse part 13 of the strip 10 is mounted on a part of the substrate 12 which has mounted on its other side one of the transverse parts 15 of the strip 11 as shown in FIG. 4.

Each longitudinal part 14 of the strip 10 joining a pair of transverse parts 13 of the strip 10 is at the opposite edge of the substrate 12 to the longitudinal part 16 of the strip 11 joining the corresponding pair of transverse parts 15 of strip 11.

The longitudinal parts 14 of the strip 10 joining one transverse part 13 to its two adjacent transverse parts 13 are on opposite edges of the substrate. The longitudinal parts 16 of strip 11 joining one transverse part 15 to its two adjacent transverse parts 15 on opposite edges of the substrate. Some longitudinal parts 14 have laterally extending lugs 17. Some longitudinal parts 16 have laterally extending lugs 18. A resistor 19 is electrically connected between each pair of adjacent legs 17 and 18. A hole 20 is provided in the substrate through which the insulated connection of the resistor to the lug 18 passes.

The strip 10 is terminated at one end by an input terminal 21 and at the other end by an output terminal 22. The strip 11 is terminated at one end by an input terminal 23 and at the other end by an output terminal 24. The strips 10 and 11 are inductive along their lengths and there is shunt capacitance between the strips.

The resistors 19 are of suitable values so to increase the shunt conductance that the ratio of the shunt capacitance to shunt conductance is substantially equal to the ratio of the inductance to the series resistance for any length of the line whereby the distortions from variation in frequency are negligible.

Thus it is possible to make a substantial reduction of the width of the strips 10 and 11 without the apparatus suffering from the variation of impedance with frequency arising from the concomitant increase in resistance.

A delay line as shown in FIGS. 3 and 4 can therefore be made substantially smaller than the one shown in FIGS. 1 and 2 and provide the same delay, for example, a typical delay line as shown in FIGS. 1 and 2 has strips of width 0.0625 inches and spacings between strips 0.0625 inches whereas the corresponding delay line of FIGS. 3 and 4 has strips of width 0.010 inches and spacings between strips of 0.005 inch.

Figure 5:
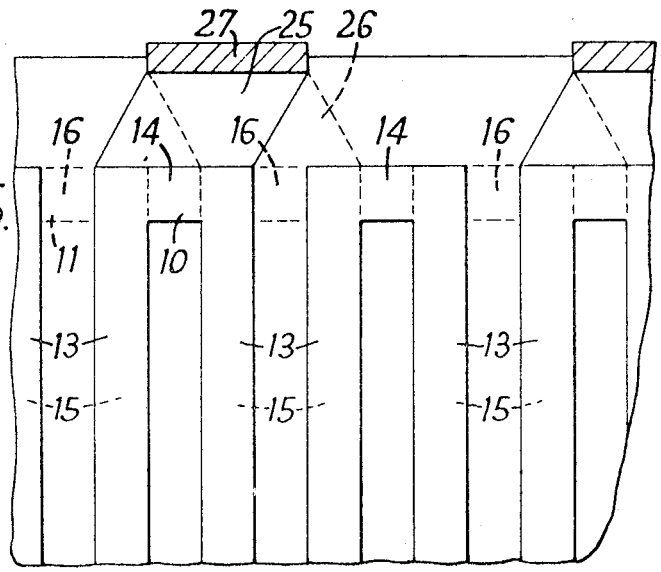
FIG. 5 shows a fragmentary plan of another embodiment of the invention.

Referring to FIG. 5, this shows another embodiment of the invention.

Two strips 10 and 11 are mounted on a substrate 12 and have the same shape and disposition on the substrate as the strips described hereinbefore with reference to FIGS. 3 and 4.

Some longitudinal parts 14 of the strip 10 have thick films of resistive material 25 extending from their lateral edges towards the edge of the substrate. Such films can, for example, be applied in the form of a paste by silk-screen printing. A suitable paste is a resistive glaze of Cermet coating as sold by Du Pont de Nemours & Co.

Similarly some longitudinal parts 16 of the strips 11 have thick films of resistive material 26 extending from their lateral edges towards the edge of the substrate 12.

Pairs of films of resistive material 25 and 26 are joined by a silvered edge on the substrate 12.

The thick film resistor made up by the thick films of resistive material 25 and 26 and the silvered edge 27 is functionally equivalent to the resistor 19 of FIGS. 3 and 4 and by correctly dimensioning the films of resistive material the resistance of the thick film resistor will take a value that will make the ratios of inductance to series resistance and shunt capacitance to shunt conductance equal.

Figure 6:
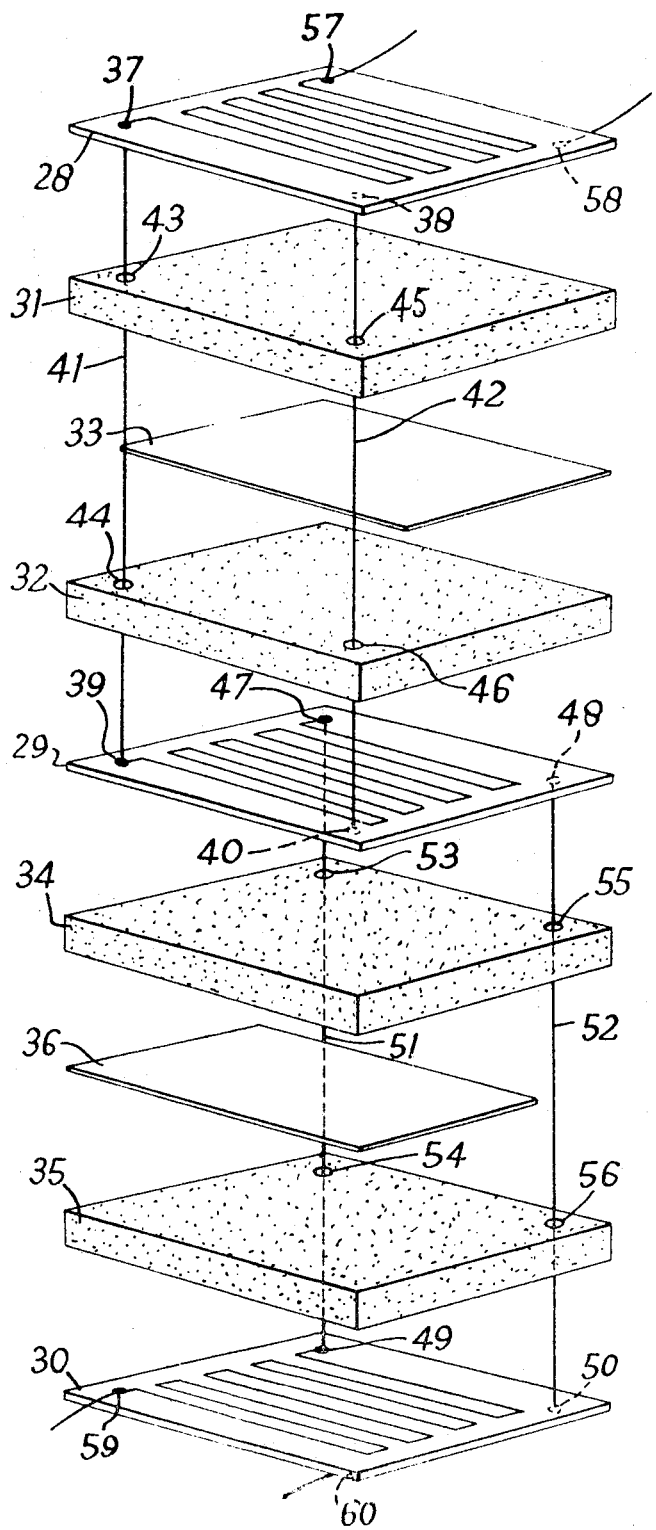
FIG. 6 shows an exploded view of a composite delay line comprising three delay-line sections of the type shown in FIG. 5.

Referring to FIG. 6, this shows an exploded view of a composite delay line comprising three delay-line sections of the type shown in FIG. 5.

Three delay-line sections shown symbolically at 28, 29 and 30, formed on substrates of mica and of the type shown in FIG. 5, are placed, one over another. The delay lines 28 and 29 are separated by two sheets of electrically insulating material 31 and 32, typically of the material sold under the trademark "Teflon," polytetrafluoroethylene (P.T.F.E.) or expanded polystyrene and one earthed screen 33, typically of copper, silver or aluminum foil, the earthed screen 33 separating the two sheets of insulting material 31 and 32.

The delay-line sections 29 and 30 are separated by two sheets of electrically insulating material 34 and 35, and one earthed screen 36, the earthed screen 36 separating the two sheets of insulating material 34 and 35.

The output terminals 37 and 38 of the delay-line section 28 are connected to the input terminals 39 and 40 of the delay-line section 29 respectively by wires 41 and 42. The wire 41 passes through holes 43 and 44 in sheets 31 and 32 respectively. The wire 42 passes through holes 45 and 46 in sheets 31 and 32 respectively. The earthed sheet 33 does not extend over the holes 43, 44, 45 and 46.

The output terminals 47 and 48 of the delay line 29 are connected to the input terminals 49 and 50 of the delay line 30 respectively by wires 51 and 52. The wire 51 passes through holes 53 and 54 in sheets 34 and 35 respectively. The wire 52 passes through holes 55 and 56 in sheets 34 and 35 respectively. The earthed sheet 36 does not extend over the holes 53, 54, 55 and 56.

The delay-line section 28 has input terminals 57 and 58 and the delay-line section 30 has output terminals 59 and 60.

The three delay-line sections 28, 29 and 30 are thus combined to form one composite delay line with input terminals 57 and 58 and output terminals 59 and 60.

By terminating delay-line sections in this way a composite delay line is equivalent with respect to delay time to a single delay line having three times the length of the composite delay line.

In an example of a delay line constructed according to the invention and giving a delay of 120 nanoseconds over a bandwidth of 25 MHz. there is a single laminate of 85 convolutions. The strips are of copper foil 0.00075 inch thick and are 0.017 inch wide. The transverse parts are 2 inch long and 0.017 inch apart. There are 12 2,200-ohm resistors distributed along the line. A sheet of epoxy glass 0.006 inch thick forms the substrate. For 1 centimeter length of line, the series inductance is 12 nh., the series resistance is 48 m ohms and the shunt capacitance is 1.6 pF. The only contribution to the shunt conductance is from the shunt-connected resistors and is $6.4 \times 10^{16}$ mhos per cm.

Although the invention has been described with reference to a form thereof in which printed conductors are arranged on an insulating substrate, it will be appreciated that the invention can take other forms. For example a coaxial delay line with a compact helical central conductor of fine wire can be provided with discrete loading resistors at points along its length or it may be that the use of an appropriate loaded filler will obviate the need for discrete resistors.

We claim:
1. An electric delay line comprising:
    an insulating substrate,
    two input terminal means;
    two output terminal means;
    two conducting paths on opposed sides of said substrate between the said two input terminal means and the said two output terminal means respectively;
    inductive loops in at least one of the conducting paths, the series inductance for a predetermined unit length of the delay line being L, the series resistance thereof being R and the shunt capacitance being C; and
    artificial shunt-loading means, comprising resistance connected between said two conductive paths, for increasing the conductance between said paths, the value of said resistance being selected so that the shunt conductance G of the unit length of line causes the ratio C/G to be substantially equal to the ratio L/R.
2. A delay line according to claim 1, wherein said substrate is a sheet of insulating material.
3. A delay line according to claim 1, wherein said shunt-loading means comprise films of resistive material deposited on said substrate.
4. A delay line as claimed in claim 3, and including metallic conducting edge layers interconnecting said resistive layers in pairs.
5. A delay line according to claim 2, wherein the conducting paths include transverse parts and longitudinal parts, the two opposite ends of a transverse part being joined respectively to the two transverse parts immediately adjacent the said transverse part by two longitudinal parts.
6. A delay line according to claim 5, wherein the transverse parts of one conducting path are in register with the transverse parts of the other conducting path, the longitudinal part joining two transverse parts in the one path being at the ends of the transverse parts remote from the longitudinal part joining the transverse parts of the other path in register with the said two transverse parts of the one path.

7. A composite electrical delay line comprising:
a plurality of subsidiary delay lines connected in series, each said subsidiary delay line comprising:
two input terminal means;
two output terminal means;
two conducting paths between the said two input terminal means and the said two output terminal means respectively;
inductive loops in at least one of the conducting paths, the series inductance for a predetermined unit length of the delay line being L, the series resistance thereof being R and the shunt capacitance being C; and
artificial shunt-loading means, comprising resistance connected between said two conductive paths, for increasing the conductance between said paths, the value of said resistance being selected so that the shunt conductance G of the unit length of line causes the ratio C/G to be substantially equal to the ratio L/R and the output terminal means of one of said subsidiary delay lines being connected to the input terminal means of one other of said subsidiary delay lines, and wherein
the conductive paths of each of the delay line sections are disposed one over another and in each intervening gap there is provided an earthed electrically conducting screen.

8. A delay line according to claim 7, wherein the earthed screen is separated from the delay lines by electrically insulating sheets.

9. An electrical delay line embodying, in combination,
a substrate comprising a flat sheet of insulating material;
two input terminal means;
two output terminal means;
two conducting strips between said two input terminal means and said two output terminal means respectively, said two conducting strips being mounted on opposed sides of said substrate;
inductive loops in said two conducting strips, the conducting strips including transverse parts and longitudinal parts, the two opposite ends of a transverse part being joined respectively to the two transverse parts immediately adjacent the said transverse part by two longitudinal parts whereby the transverse and longitudinal parts form inductive loops, the transverse parts of one conducting strip being in register with the transverse parts of the other conducting strip and the longitudinal part joining two transverse parts in the one strip being at the ends of the transverse parts remote from the longitudinal part joining the transverse parts of the other strip in register with said transverse part of the one strip, and
artificial shunt-loading means comprising resistors connected at discrete positions along the length of the delay line between said two conductive paths for increasing the conductance between said paths, the values of said resistors being selected so that the shunt conductance G of a unit length of line renders the ratio C/G substantially equal to the ratio L/R, where for the predetermined unit length of line L is the series inductance, R is the series resistance, and C is the shunt capacitance.